Oct. 13, 1959 D. GIACOSA 2,908,352
LUBRICANT FILTERING SYSTEM
Filed June 5, 1957 4 Sheets-Sheet 1

Oct. 13, 1959     D. GIACOSA     2,908,352
LUBRICANT FILTERING SYSTEM
Filed June 5, 1957     4 Sheets-Sheet 3

United States Patent Office 2,908,352
Patented Oct. 13, 1959

2,908,352

LUBRICANT FILTERING SYSTEM

Dante Giacosa, Turin, Italy, assignor to Fiat Societa per Azioni, Turin, Italy

Application June 5, 1957, Serial No. 663,632

Claims priority, application Italy June 5, 1956

20 Claims. (Cl. 184—6)

The present invention relates to a device for transferring a liquid from a stationary pipe to passages machined inside a rotating shaft, particularly for feeding oil under pressure to a centrifugal filter mounted on the end of a crankshaft extension of an internal combustion engine and for returning the oil cleaned by said filter.

This device is particularly, even if not exclusively, applicable to the lubricating oil circuits of internal combustion engines, including two ducts for feeding the lubricating oil to the crankshaft journals and crankpins, the first running inside the crankshaft and the second passing in the crankcase walls.

According to the invention the device is characterised by the fact that it comprises some passages inside the crankshaft supporting structure and communicating with eccentric axial passages machined inside the crankshaft extension, through an annular cavity formed in a non-rotating thrust-ring, axially sliding along said extension and held in position for tightness by the oil pressure against a shoulder integral with crankshaft.

The invention is described with reference to the enclosed drawings, attached as mere non-restrictive example, in which.

Figure 1:
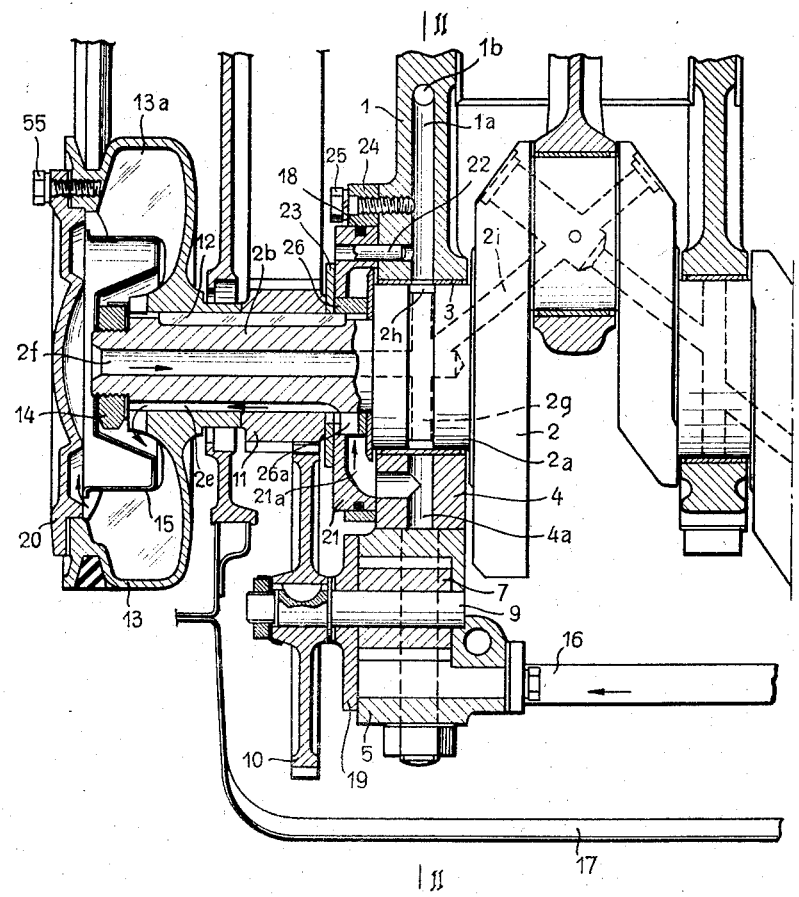
Figure 1 is a partial section, in a vertical plane through the crankshaft axis, of an engine equipped with a transferring device according to the invention.
Figure 2:
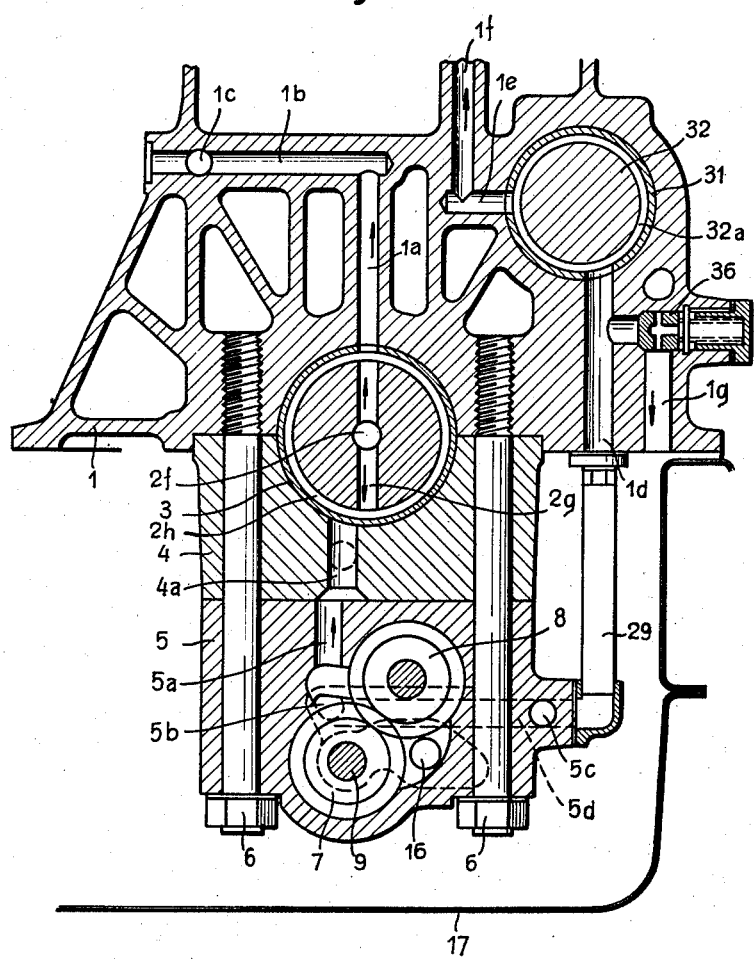
Figure 2 is a cross section of Fig. 1 along line II—II.

Referring first to the embodiment represented by Figures 1 and 2, 1 indicates the engine crankcase equipped with semi-circular seats for the main bearing of the crankshaft 2.

The bearing for the first crankshaft journal $2a$ is indicated at 3 and is placed between one of said semi-circular seats in the crankcase 1 and a corresponding semi-circular seat formed in a body 4 fixed, together with lubricating oil pump body 5, to crankcase 1 by means of studs 6.

The pump is of the gear type: pump gear 7 is keyed to a shaft 9 which, outside pump cover 19, carries a gear 10 engaging with a pinion 11 which, in turn, is fixed by means of a Woodruff key 12 to an extension $2b$ of crankshaft 2.

A centrifugal filter is mounted on the end of extension $2b$, and consists of a hollow casing 13, equipped with internal vanes $13a$ and blanked on its front side by means of a cover 20 fixed to body 13 with screws 55.

Body 13 is rotatably fast on crankshaft extension $2b$, to which it is fixed by means of the Woodruff key 12 and is secured axially by a locknut 14; the end of the extension $2b$ carries also a stamped baffle plate 15.

16 indicates a pipe through which the gear pump sucks oil from engine sump 17.

The delivery port of the pump is divided in two ducts, one of which is designed to supply oil to the bearings of crankshaft journals and crankpins, while the second supplies oil to the valve gear.

The first duct consists of a hole $5a$ drilled in body 5, communicating with a second hole $4a$, drilled in body 4 which forms the lower part of the first main bearing; hole $4a$ communicates with an annular cavity $21a$, machined in a thrust-ring 21, prevented from rotating by a dowel 22, and free to slide axially for a limited travel between the front face of the first main bearing and a thrust washer 23 rotating together with crankshaft extension $2b$, to which it is secured by means of Woodruff key 12.

In an annular groove machined outside thrust-ring 21 a rubber-ring 18 is placed, which ensures oil tightness against a ring 24 fixed to the first main bearing by means of the screws 25.

Around crankshaft extension $2b$, between crankshaft 2 and thrust-ring 21, is placed a ring 26 fixed to extension $2b$ by means of Woodruff key 12 and equipped with a duct $26a$ in communication with the annular cavity in the thrust-ring.

Through this duct and a slot machined in thrust-washer 23, the oil is conveyed to an eccentric axial passage consisting of a groove $2e$ parallel to the crankshaft axis and machined inside crankshaft extension $2b$, and therefrom passes to the centrifugal filter.

At the filter outlet the oil flows along an axial passage $2f$ machined inside extension $2b$, and reaches some radial holes $2g$ drilled inside the first journal $2a$; therefrom oil passes into an annular groove $2h$ machined in said first journal.

Inside the crankshaft is also drilled a conventional rifle hole $2i$ for lubricating the journals and crankpins of the crankshaft.

From groove $2h$ the oil passes, through a hole drilled in bearing 3, into a vertical passage $1a$ machined inside engine crankcase walls; passage $1a$ is in communication with a cross passage $1b$ which, in turn, communicates with a longitudinal passage $1c$ provided inside the crankcase itself; further cross passages (not shown on the drawings) branching from the passage $1c$ supply oil to the next main bearing.

The supply of lubricating oil to the crankshaft bearing is therefore performed through the hole $5a$ of the pump body 5, the duct $4a$ of the lower part 4 of the first main bearing, the annular cavity $21a$ of the thrust-ring 21, the hole $26a$ of the ring 26, the eccentric axial duct or groove $2e$ of the crankshaft extension, the centrifugal filter, the passage $2f$ of the crankshaft extension, the passages $2i$ of the crankshaft and in parallel with these last ones, through the hole $2g$ of the first journal, the annular groove $2h$ of the said first journal, the passage $1a$ of the engine crankcase, the passages $1b$ and $1c$ of said crankcase.

With such an arrangement the center and rear main bearings of the crankshaft are fed with lubricating oil, even in the case of obstruction of the internal duct of the crankshaft.

The second duct for feeding the valve gear of the engine is derived through the hole $5b$ downstream of pump delivery, which communicates, through a cross hole $5d$, with the axial hole $5c$, in turn communicating with a pipe 29; this latter feeds oil to a vertical hole $1d$ drilled in crankcase, which, through holes in one of the bushes 31 of the camshaft 32 and a groove $32a$ formed on the camshaft itself, in turn passes the oil to a hole $1e$ as well as to another one $1f$, the latter being designed to convey the lubricating oil to the valve gear located above.

The other bushes of the camshaft 32 receive oil through ducts similar to the pipe 29 and hole $1d$, communicating with the axial hole $5c$.

On the duct 1d branches a conventional-type oil pressure relief valve 36; the oil drained from the valve 36 flows into the passage 1g and back to the sump 17.

In the duct carrying the oil to the valve gear a filter of any type can be inserted.

By means of this double lubricant feed duct the efficiency of the centrifugal filter is increased, since its cleansing action is concentrated on the oil which flows to the main and connecting rod bearings, where it is required most.

Figure 3:
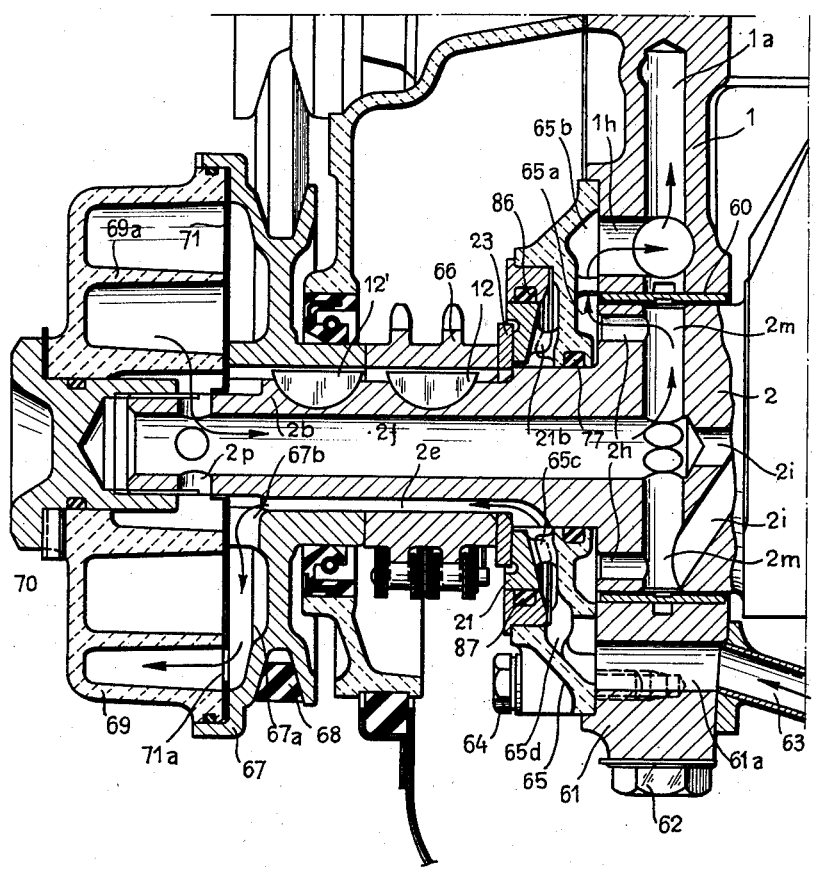
Figure 3 is a section, similar to the one in Fig. 1, showing a first variant of the invention

Figure 3 illustrates a further embodiment according to the invention; in this figure all parts operating similarly to those of Figs. 1 and 2 will be indicated by the same reference numbers.

2 is the crankshaft of an internal combustion engine and 1 the crankcase of said engine; the bearing of the first journal is indicated with 60 and the bearing lower cap with 61; the latter cap is fixed to the crankcase 1 by means of bolts 62.

Against the crankcase 1 and against the lower cap 61 of the first journal is fixed by means of screws 64 an intermediate cast body 65 in which nonrotatably slides, a thrust-ring 21 equipped with jutting ribs 21b cooperating with similar ribs 65c, jutting from intermediate body 65, ribs being designed to prevent the thrust-ring itself from rotating. A gasket 77 is used as a seal between the body 65 and the crankshaft extension 2b.

In order to simplify the casting process of the intermediate body 65, a part of the latter, 86, is manufactured separately and subsequently fixed (for instance by a forced fit) in a seat molded in the body 65. The insert part has a groove in which is seated a ring gasket 87 for oil tightness in the seat where the axial sliding of the thrust-ring 21 takes place.

The thrust-ring 21, as it will be afterwards explained, is held in position by the oil pressure against a thrust-washer 23 joined to an extension 2b of the crankshaft 2; on said extension a sprocket 66 for timing gear drive and a pulley 67 for V belt 68, are also secured by means of Woodruff key 12; the pulley 67 is coupled to a cylindrical casing 69, operating as a centrifugal filter. In the described embodiment a spiral rib 69a juts from the bottom of the casing; the filter, however, could have a different structure, for instance with radial ribs. The casing is held in position by means of a plug 70 screwed on the end of the crankshaft extension 2b; between the pulley 67 and in the casing 69 is inserted a baffle 71 equipped with one or more peripheral holes 71a for communication between the opposite sides of the baffle. A central axial passage 2f is drilled in the extension 2b and communicates, through radial holes 2p, with the inner cavity of the casing 69.

The annular chamber 67a comprised between the disc 71 and the pulley 67 is in communication, through radial holes 67b drilled in the pulley hub, with one end of axial ducts 2e in the crankshaft extension 2b; the opposite end of ducts 2e communicate with an annular chamber comprised between the thrust-ring 21 and the intermediate body 65.

A port 65d in the lower part of the intermediate body 65, communicates on one side with the annular chamber comprised between the thrust-ring 21 and the intermediate body itself, and on the other side with a hole 61a drilled in the first main bearing cap 61; the oil under pressure is sent to the hole 61a by the engine pump through a pipe 63.

An annular cavity 65a, also in the intermediate body 65, communicates on one side with axial holes 2n drilled in the first journal, and on the other side with an upper cavity 65b in the body 65 and opening in a hole 1h drilled in the engine crankcase 1; in turn, the hole 1h communicates, through a vertical passage 1a, with the ducts carrying the oil to engine parts requiring lubrication, the ducts for crankshaft lubrication from outside being therewith included.

The axial holes 2h of the first journal communicate with radial holes 2m of said first journal. Communicating with said radial holes 2b; branching from the holes 2m are holes 2i, for lubricating the crankshaft from inside.

The oil arriving from the pump through the pipe 63, flows across the hole 61a of cap 61, passes into the port 65d of the intermediate body, enters the annular chamber comprised between said intermediate body and thrust-ring 21, and flows into the axial eccentric ducts 2e of the extension 2b and into the holes 67b of the pulley hub 67 and, ultimately, into the chamber 67a. From this chamber the oil, through the holes 71a, passes into the centrifugal filter where, by running in the spiral labyrinth comprised between the filter walls and the spiral ribs 69a, it deposits the contaminants, and next, through the radial holes 2p, it passes into the crankshaft extension 2b. On flowing out of passage 2f the oil divides in two streams, one of which runs through the holes 2i and lubricates the crankshaft from inside, while the other one, through the holes 2h, the upper cavities 65a and 65b of the intermediate body 65, passes into the crank case ducts to lubricate the crankshaft from outside and the other parts of the engine.

The thrust-ring 21 is held in position by the oil pressure against shoulder 23 and is used to provide tightness between said shoulder, rotatable with crankshaft, and the crankcase of which said thrust-ring has become a part as its rotation is impeded.

Figure 4:
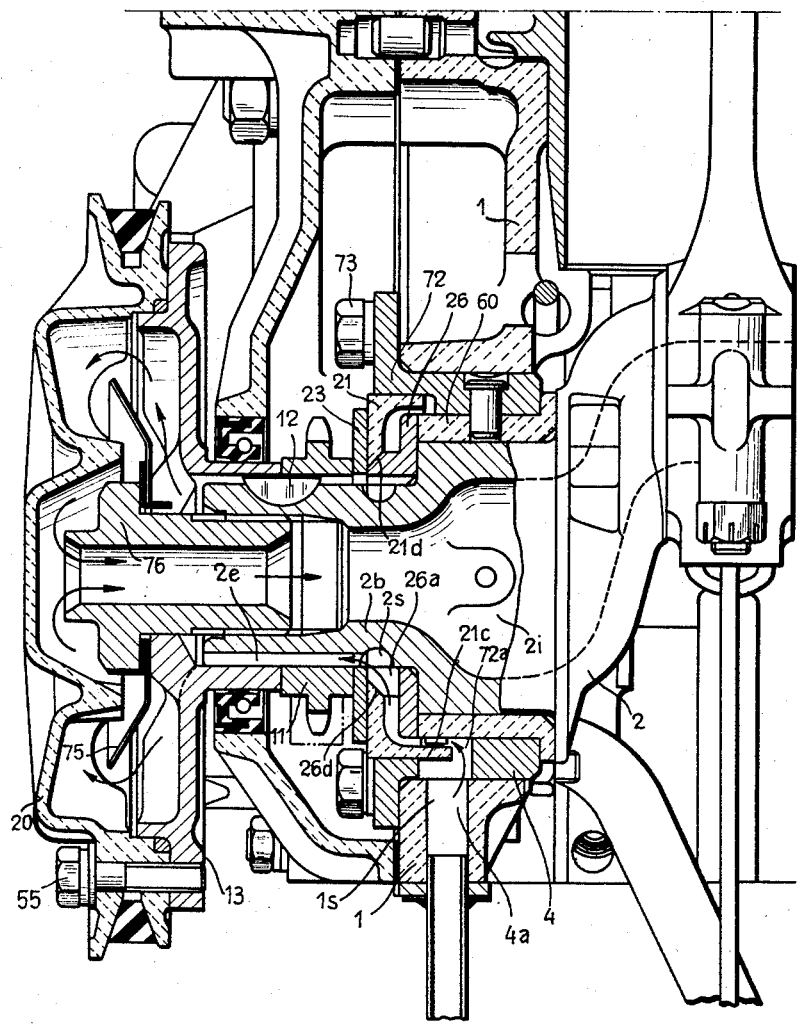
Figure 4 is a section, similar to Fig. 1, showing a second variant of the invention.

In Figure 4 another variant of an embodiment of the invention is illustrated.

At 2 is indicated the crankshaft of an engine; the first journal of said crankshaft rotates in a bearing 60 mounted in a circular flanged support 72, fixed to crankcase 1 by means of screws 73.

Crankshaft 2 is equipped with an extension 2b on the end of which is fixed a centrifugal filter, consisting of two parts 13 and 20 secured to each other by means of screws 55; between the two parts is inserted a dished baffle 75, fixed to the crankshaft extension by means of a drilled plug 76, which also serves for fixing the relevant parts of the unit.

Extension 2b carries an intermediate square-sectioned ring 26, in which are drilled holes 26a that communicate, through a groove 2S, with axial ducts 2e in the extension 2b.

Around the extension 2b is also placed a thrust-ring 21, which, under the action of the oil pressure, is held against a thrust-washer 23, said washer being rotatably integral with extension 2b; on said extension is also secured, by means of a Woodruff key 12, a sprocket 11 for engine timing gear drive.

Thrust-ring 21 is slidable axially in an annular seat machined in the flanged support 72 of the bushing 60.

A hole 1S in the crankcase wall communicates with a hole 72a drilled in the flanged support 72; said hole 72a communicates, in turn, with an annular chamber comprised between the ring 26 and the thrust-ring 21. Thrust-ring 21 is equipped with a projection 21c extending into hole 72a and designed to prevent thrust-ring rotation.

According to the invention, the axial shoulder on the opposite side of the thrust-washer 23, for the thrust-ring 21, consists of a tapered face 26d of the intermediate ring 26; said face is in contact with a corresponding tapered face 21d, machined on the thrust-ring itself.

The oil flowing from the pump through the duct 4a enters the annular chamber comprised between the intermediate ring 26 and thrust ring 21, flows through holes 26a in the ring 26, into the axial eccentric duct 2e of the extension 2b and into the filter, leaving the latter through the axial bore in the drilled plug 76.

On flowing out of the bore of the plug 76 the oil reaches the inner hole 2i in the crankshaft and lubricates its main bearing, then ducts (not shown) through which it reaches other engine parts requiring lubrication.

It will be understood, of course, that the invention is not to be regarded as being limited in scope and principle, but includes all changes and modifications coming within the terms of the claims hereof.

What I claim is:

1. An oil filtering system for cleaning lubricating oil used in lubricating bearing surfaces and wearing parts of internal combustion engines of motor vehicles comprising, in combination with an engine having a driven crankshaft and main bearings for rotatably mounting the crankshaft, a longitudinal extension on one end of the crankshaft and driven therewith, a centrifugal filter mounted on a free end of the extension so as to be rotatably driven thereby, stationary means supporting the crankshaft defining an oil receiving inlet passageway to the filter in conjunction with the extension with a passageway extending longitudinally and eccentrically of the extension, the extension having an outlet passageway in communication with the filter for returning filtered oil to the engine main bearings along a path extending axially of the extension, and housing means defining a passageway in communication with said outlet passageway for providing lubricating oil to other engine wearing parts other than the main bearings and to the main bearings from the outside.

2. An oil filtering system for cleaning lubricating oil used in lubricating bearing surfaces and wearing parts of internal combustion engines of motor vehicles comprising, in combination with an engine having a driven crankshaft and main bearings for rotatably mounting the crankshaft, a longitudinal extension on one end of the crankshaft and driven therewith a centrifugal filter mounted on a free end of the extension so as to be rotatably driven thereby, stationary means supporting the crankshaft defining an oil receiving inlet passageway to the filter in conjunction with the extension with a passageway extending longitudinally and eccentrically of the extension, the extension having an outlet passageway in communication with the filter for returning filtered oil to the engine along a path extending axially of the extension, the crankshaft having a passageway in communication with the outlet passageway for providing lubricating oil to the main bearings, and housing means defining a passageway in communication with said outlet passageway for providing lubricating oil to other engine wearing parts other than the main bearings and to the main bearings from the outside.

3. An oil filtering system for cleaning lubricating oil used in lubricating bearing surfaces and wearing parts of internal combustion engines of motor vehicles comprising, in combination with an engine having a driven crankshaft and main bearings for rotatably mounting the crankshaft, a longitudinal extension on one end of the crankshaft and driven therewith, a centrifugal filter mounted on a free end of the extension so as to be rotatably driven thereby, stationary means supporting the crankshaft defining an oil receiving inlet passageway to the filter in conjunction with the extension with a passageway extending longitudinal and eccentrically of the extension, the extension having an outlet passageway in communication with the filter for returning filtered oil to the engine main bearings along a path extending axially of the extension, and main bearing housing means defining a passageway in communication with said outlet passageway for providing filtered lubricating oil to other engine wearing parts other than the main bearings and to the main bearings from the outside, a nonrotatable thrust ring cooperating with the crankshaft and disposed around said extension, the ring having an oil passageway in communication with said eccentric inlet passageway, and means for delivering oil under pressure to said filter through the ring passageway and through said eccentric passageway.

4. An oil filter system according to claim 3, in which said main bearing housing means comprises a housing for an end main bearing for the end of the crankshaft to which the extension is attached and in which the thrust ring is slidable axially of the extension a limited extent, including annular guide means unitary with the bearing housing for guiding the thrust ring axially on the extension, and a sealing ring disposed radially of the thrust ring forming a fluid-tight seal between the guide means and the thrust ring.

5. An oil filtering system according to claim 3, including a washer disposed between the thrust ring and the end of the crankshaft on which the extension is mounted forming a fluid-tight seal in cooperation with bearing surfaces on the extension to preclude oil from the inlet passageway from flowing in a direction toward the engine main bearings.

6. An oil filtering system according to claim 3, in which the main bearings of the engine comprise an end main bearing at the end of the crankshaft on which the extension is mounted, the crankshaft having a journal in said end main bearing and an axial passageway in the journal in communication with the axial passageway in the extension, the journal having a peripheral groove in communication with the passageway in said bearing housing and radial passageways providing communication between the axial passageway of the journal and the peripheral groove.

7. An oil filtering system according to claim 3, including a stationary intermediate member intermediate the crankshaft and the thrust ring, the thrust collar and the member having cooperating ribs for maintaining the thrust ring stationary and the intermediate member having an oil passageway providing communication between the thrust ring passageway and the means for delivering oil under pressure.

8. An oil filtering system for cleaning lubricating oil used in lubricating bearing surfaces and wearing parts of internal combustion engines of motor vehicles comprising in combination with an engine having a driven crankshaft and main bearings for rotatably mounting the crankshaft, a longitudinal extension on one end of the crankshaft and driven therewith, a centrifugal filter mounted on a free end of the extension so as to be rotatably driven thereby, stationary means supporting the crankshaft defining an oil receiving inlet passageway to the filter in conjunction with the extension with a passageway extending longitudinally and eccentrically of the extension, the extension having an outlet passageway in communication with the filter for returning filtered oil to the engine along a path extending axially of the extension, the crankshaft having a passageway in communication with the outlet passageway for providing lubricating oil to the main bearings and housing means defining a passageway in communication with said outlet passageway for providing lubricating oil along another path to the engine main bearings.

9. An oil filtering system for cleaning oil used in lubricating bearing surfaces and wearing parts of internal combustion engines of motor vehicles comprising in combination with an engine having a driven crankshaft and main bearings for rotatably mounting the crankshaft, a longitudinal extension on one end of the crankshaft and driven therewith a centrifugal filter mounted on a free end of the extension so as to be rotatably driven thereby, stationary means supporting the crankshaft defining an oil receiving inlet passageway to the filter in conjunction with the extension with a passageway extending longitudinally and eccentrically of the extension, the extension having an outlet passageway in communication with the filter for returning filtered oil to the engine along a path extending axially of the extension, the crankshaft having a passageway in communication with the outlet passageway for providing lubricating oil to the main bearings, and housing means defining a passageway in communication with said outlet passageway for providing lubricating oil along another path to engine main bearings.

10. An oil filtering system for cleaning lubricating oil used in lubricating surfaces and wearing parts of internal combustion engines of motor vehicles comprising in combination with an engine having a driven crankshaft and main bearings for rotatably mounting the crankshaft, a longitudinal extension on one end of the crankshaft and driven therewith, a centrifugal filter mounted on a free end of the extension so as to be rotatably driven thereby, stationary means supporting the crankshaft defining an oil receiving inlet passageway to the filter in conjunction with the extension of a passageway extending longitudinally and eccentrically of the extension, the extension having an outlet passageway in communication with the filter for returning filtered oil to the engine along a path extending axially of the extension, the crankshaft having a passageway in communication with the outlet passageway for providing lubricating oil to the main bearings and main bearing housing means defining a passageway in communication with said outlet passageway for providing filtered lubricating oil along another path to the engine main bearings, a non-rotatable thrust ring cooperating with the crankshaft arranged around said extension, the ring having an oil passageway in communication with said eccentric inlet passageway, and means for delivering oil under pressure to said filter through the ring passageway and through said eccentric passageway.

11. An oil filtering system according to claim 10, in which the passageway in the thrust ring comprises an annular cavity, an intermediate ring unitary with the crankshaft and between it and the thrust ring, the intermediate ring having an oil passageway to provide communication between the thrust ring passageway and means for delivering oil under pressure.

12. An oil filtering system according to claim 10, in which said main bearing housing means comprises a housing for an end main bearing for the end of the crankshaft to which the extension is attached and in which the thrust ring is slidable axially of the extension a limited extent, including annular guide means unitary with the bearing housing for guiding the thrust ring axially on the extension, and a sealing ring arranged radially of the thrust ring forming a fluid-tight seal between the guide means and thrust ring.

13. An oil filtering system according to claim 10, including a washer arranged between the thrust ring and the end of the crankshaft on which the extension is mounted forming a fluid-tight seal in cooperation with bearing surfaces on the extension to preclude oil from the inlet passageway from flowing in a direction towards the engine main bearings.

14. An oil filtering system according to claim 10, in which the thrust ring is movable axially on the extension a limited extent, dowel means inserted in the bearing housing and the thrust ring to preclude rotation of the thrust ring.

15. An oil filtering system according to claim 10, in which the main bearings of the engine comprise an end main bearing at the end of the crankshaft on which the extension is mounted, the crankshaft having a journal in said end main bearing and an axial passageway in the journal in communication with the axial passageway in the extension, the journal having a peripheral groove in communication with the passageway in said bearing housing and radial passageways providing communication between the axial passageway in the journal and the peripheral groove.

16. An oil filtering system according to claim 15, including conduit means defining an oil flow path to the main bearings other than through the crankshaft, said conduit means being in communication with said peripheral groove.

17. An oil filtering system for cleaning lubricating oil used in lubricating bearing surfaces and wearing parts of internal combustion engines of motor vehicles comprising, in combination with an engine having a driven crankshaft and main bearings for rotatably mounting the crankshaft, a longitudinal extension on one end of the crankshaft and driven therewith, a centrifugal filter mounted on a free end of the extension so as to be rotatably driven thereby, stationary means supporting the crankshaft defining an oil receiving inlet passageway to the filter in conjunction with the extension with a passageway extending longitudinally and eccentrically of the extension, the extension having an outlet passageway in communication with said filter for providing filtered lubricating oil to engine, the crankshaft having a passageway in communication with the outlet passageway for providing lubricating oil to the main bearings, a non-rotatable thrust ring cooperating with the crankshaft arranged around said extension, the ring having an oil passageway in communication with said eccentric inlet passageway, and means for delivering oil under pressure to said filter through the ring passageway and through said eccentric passageway.

18. An oil filtering system according to claim 17, in which the passageway in the thrust ring comprises an annular cavity, an intermediate ring unitary with the crankshaft and between it and the thrust ring, the intermediate ring having an oil passageway to provide communication between the thrust ring passageway and the means for delivering oil under pressure.

19. An oil filtering system according to claim 18 in which the thrust ring and intermediate ring contact along corresponding tapered annular surfaces.

20. An oil filtering system according to claim 17, in which said main bearing housing means comprises a housing for an end main bearing for the end of the crankshaft to which the extension is attached and in which the thrust ring is slidable axially of the extension a limited extent, including annular guide means unitary with the bearing housing for guiding the thrust ring axially on the extension, a projection on the thrust ring side facing said end main bearing projecting into a radial hole bored in said annular guide means to preclude rotation of the thrust ring.

References Cited in the file of this patent

UNITED STATES PATENTS

| 2,473,701 | Bullock | June 21, 1949 |

FOREIGN PATENTS

| 292,774 | Great Britain | June 28, 1928 |
| 55,038 | Norway | Mar. 25, 1935 |
| 1,101,137 | France | Apr. 13, 1955 |